Jan. 18, 1955 G. A. KELLICOTT 2,699,891
BAGGING APPARATUS
Filed Aug. 17, 1948
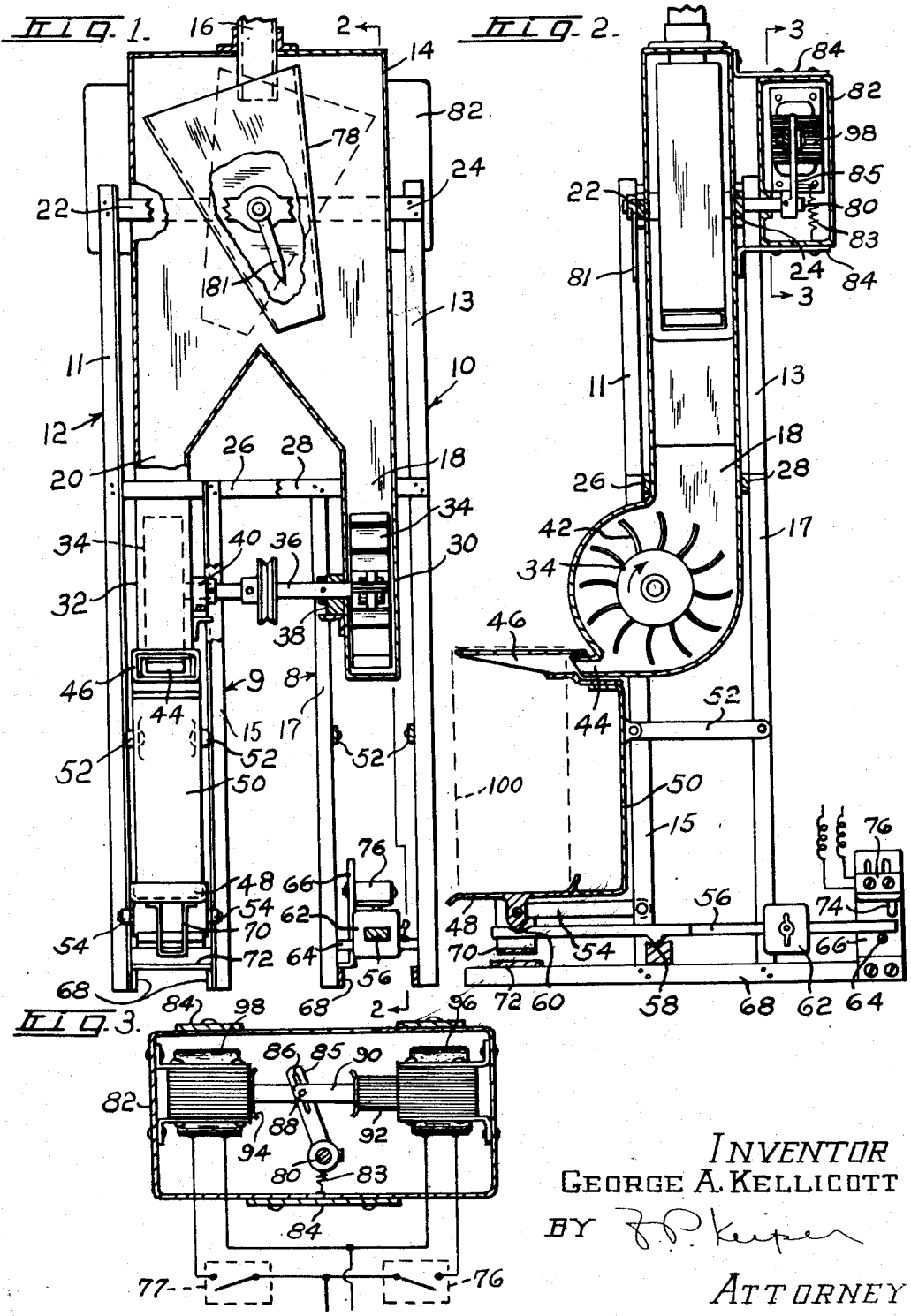
INVENTOR
GEORGE A. KELLICOTT
BY
ATTORNEY

United States Patent Office 2,699,891
Patented Jan. 18, 1955

2,699,891

BAGGING APPARATUS

George A. Kellicott, Baldwinsville, N. Y.

Application August 17, 1948, Serial No. 44,717

1 Claim. (Cl. 226—48)

This invention relates to bagging apparatus, and more particularly to apparatus adaptable to handling and weighing salts and the like which are susceptible to caking.

In apparatus of the type described, it has been the practice so to direct a substantially continuous flow of salts such as ammonium chloride and the like into bags of, for example, the valve type, the salts being weighed upon filling the bag or being weighed in a separate weighing receptacle prior to subsequent flow into the final bag or package. In such apparatus, it has been the practice to stop the flow of such material as by valvular means upon the accumulation of a measured quantity until such measured quantity may be transferred to a bag or until the bag in which the quantity is directly measured is removed from the apparatus and a new bag, sack or container is placed in position. Stoppage of the flow of material of the type described results in the same piling up and packing in the ducts through which the material is delivered. Slight dampness or other adhering properties of the material may cause the material to be compacted and jammed, adhere to the duct walls, resulting in stoppage of the flow and temporarily suspending the otherwise relatively continuous operation of the weighing and packaging apparatus.

It is an object of the present invention to provide an apparatus of the class described, wherein continuous flow of the material being packaged is provided for, and in which there is no stoppage of such flow for weighing purposes or any other purpose.

Another object of the invention is the provision of apparatus of the type described in which dual weighing and packaging stations are employed, and in which flow of material is continuous to either one stage or the other.

Another object of the invention is the provision of apparatus of the type described which is peculiarly suitable to the filling of valve type bags requiring a horizontal filling nozzle, and in which special provision is made for causing and assuring the flow of material along a horizontal duct leading to each filling nozzle.

Still another object of the invention is the provision of the apparatus set forth employing such filling nozzles, wherein power means is utilized for imparting horizontal velocity to the material being delivered to the bag filling nozzles.

A still further object of the invention relates to automatic sequential operation of the distributing valve controlling the flow of material to one station or the other in response to a measured quantity of material being received in a package at one or the other station.

Still a further object of the invention relates to the arrangement of a bag supporting scale platform and nozzle such that accurate weighing may be had regardless of the horizontal nozzle connection required for filling valve type bags.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

In the drawings, in which like reference characters indicate like parts:

Figure 1 is a front elevation of a form of the apparatus, with parts thereof broken away and shown in section;

Figure 2 is a vertical transverse section taken through Figure 1 substantially on the line 2—2; and Figure 3 is a sectional view of the valve shifter taken substantially on the line 3—3 of Figure 2, and including an operating circuit diagram.

Referring to the drawings, and more particularly to Figures 1 and 2, there is shown a frame structure comprising spaced side frames 10 and 12, each comprising front and rear uprights 11 and 13, between which there is arranged a distributing box 14 having an inlet duct 16 at the top and outlet ducts 18 and 20. The box 14 is supported from the side frame members 10 and 12 upon cross members 22 and 24 at the upper end and 26 and 28 at the lower end. Each of the outlet ducts 18 and 20 leads downwardly to circular impeller housings 30 and 32, each containing a rotatable impeller such as 34. The impellers are mounted for rotation upon a common shaft 36 extending from impeller housing 30 to impeller housing 32, there being provided journals for such shaft as at 38 and 40 immediately outside the facing side walls of the impeller housings. The impeller housings are located between side frames 10 and 12 and intermediate shorter frames 8 and 9 each comprising uprights 15 and 17 extending to cross members 26 and 28.

It will be seen that the impeller housing is circular and closely fits the curved blades 42 of the impellers, and is connected to the branch outlet ducts 18 or 20 in a tangential manner so that material descending into such ducts will fall within the path of the rotating impellers. Such impellers rotate in a clockwise direction as viewed in Figure 2. The impeller chamber is provided with a tangential horizontal discharge duct 44 at the bottom through which material descending in the outlet ducts 18 and 20 may be forcefully ejected with considerable horizontal velocity imparted thereto by the rapidity of the rotating impeller blades, suitably power driven.

Discharge from each of the impellers is directed into a bag filling apparatus comprising a nozzle 46 rigidly connected to a bag supporting platform 48 through a vertical member 50, the whole assembly being supported for rectilinear motion by reason of links 52 and 54 extending to the vertical member 50 and the bag support 48 from the uprights 13 and 11, respectively, of side frame 10 and the members 15 and 17 of frame 8.

Each of the bag filling platforms 48 and cooperating filling nozzle assemblies is supported upon a scale beam 56 fulcrumed as at 58, pressure being applied to such scale beam by a suitable knife edge or the equivalent as at 60. The opposite end of the beam is provided with an adjustable counterweight 62 and the forward end of the scale beam is adapted to be limited in its upward motion by a stop pin 64 mounted in a switch supporting bracket 66 carried upon each of the frame base members 68. Downward movement of each of the bag supporting platforms 48 is limited by a buffer 70 adapted to engage upon limited travel a pad 72 resting upon the base 68, and in practice such pad 72 may be of resilient shock absorbing material, such as rubber or the like, as will be appreciated by those skilled in the art. It will be seen that the rearward portion of each of the scale beams is positioned to move in the path of a sensitive electric switch plunger 74 such that the switch 76 (or 77, as the case may be) will be closed upon movement of each of the cooperative scale beams a predetermined distance away from their respective pins 64.

Such switches are utilized for the purpose of rendering the apparatus in part automatic as will appear from a further description. Sufficient clearance is provided between the duct 44 and the shank of the surrounding nozzle, such that the scale platform and nozzle move free of the duct 44, and thus may accurately weigh the material delivered to the bag. In practice, any suitable flexible juncture other than the clearance overlap between duct 44 and nozzle 46 may be employed, but the velocity of the material thrown from the respective impellers will carry the material across the juncture, and because of the horizontal movement will likewise not affect the weighing accuracy.

In order to distribute material from the supply duct 16 to the outlet ducts 18 or 20 in alternate sequence, there is provided in the box 14 a funnel-like material guide chute 78 adapted to rock through a slight angle from the position indicated by the solid lines to the position shown in dotted lines in Figure 1. The funnel-shaped member is mounted upon and fixed to a cross shaft 80 journaled in bearings arranged upon the transverse members 22 and 24. The shaft extends to the rear of the uprights 13 into a solenoid actuating box 82 mounted upon brackets 84 affixed to the box 14. The shaft 80 is provided with a lever 85 having a slot 86 through which extends a pin 88 carried centrally upon a reciprocating bar 90 having at its extremities magnetic armatures 92 and 94 cooperating with solenoids 96 and 98.

It will be observed that upon the energization of either solenoid 96 or 98 that the respective armature 92 or 94 will be drawn to the right or the left respectively, and that in Figure 3, the solenoid 98 has been energized and drawn its armature 94 to the left to cause the funnel-like chute 78 to tilt to the position shown and cause material descending from the inlet duct 16 to be diverted to the outlet duct 18. The solenoids are energized by the switches 76 and 77, the switch 76 being actuated by the right hand scale beam as shown in Figure 1, and the switch 77 being that actuated by the left hand scale beam in such figure. A suitable indicator 81 serves to show the operator when the chute 78 shifts from one position to the other, so that upon starting, the operator will know which scale platform a bag is to be placed upon, and when such bag has been filled to the prescribed weight. Any suitable means may be provided for holding the chute 78 in one end position or the other, either by arranging the axis such that the weight of the upper portion of the chute overbalances the lower portion, or an over-center biasing spring such as 83 may be employed.

It will appear that upon the filling of a bag placed in the position shown at 100 in Figure 2, the scale beam will close the switch 76 which will energize the solenoid 96 drawing the armature 92 to the right and shifting the funnel chute 78 to the dotted line position, whereupon such material as is entering the inlet duct 16 will be diverted to the left hand bag filling nozzle 46, there having been placed upon the left hand scale platform 48 a bag with its valve flap end suitably arranged over the filling nozzle 46 as is well understood in the art. As a result, material flowing into the box 14 will flow down the left hand outlet duct 20 and engage the left hand impeller, whereupon the material will be somewhat accelerated and have imparted thereto a horizontal velocity which will carry the material into the nozzle where it will drop into the bag, gradually filling the same.

As such bag becomes filled to a desired weight as set by the scale supporting such bag, the switch 77 will be closed, which immediately actuates solenoid 98 and diverts the further flow of material into the right hand bag filling nozzle 46. It will be understood that while the left hand bag has been filling, a single operator will have sufficient time to remove from the right hand scale platform the bag which has been previously filled and replace the same with an empty bag. Thus, the operation of the machine continues automatically, first filling one bag and then the other, and a single operator has sufficient time during the filling operation to remove a filled bag and replace such filled bag with an empty bag during the filling of the other bag.

It will be observed that during the operation described, at no point in the entire system is the flow of material at any time interrupted or stopped, so that such material, if of a sticky or damp nature, will not have occasion to adhere to any of the surfaces of the ducts to which it may come in contact, since such material will be moving with sufficient velocity to prevent such adherence. In addition, material when it reaches a horizontal duct will have been given impetus by reason of the impeller whose blade velocity may be preferably higher than the velocity of the material falling thereupon so that the material is tangentially thrown from the impeller horizontally into the bag filling duct at such velocity that it will under no circumstances have occasion to contact momentarily with the side walls of such duct or filling nozzle and thereby adhere thereto. With such apparatus, flow will be continuous and thus no interruption can be occasioned in the operation thereof due to momentary stoppage of flow and jamming or caking and adhering of the material during such stoppage upon the duct walls. All material delivered to the impeller is promptly ejected horizontally, and when delivery to the impeller stops, the horizontal duct 44 and nozzle 46 are promptly cleared by the impeller action.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

Apparatus for filling bags with adherent material, comprising an inlet duct for receiving a continuous flow of such material, a pair of branch ducts located below said inlet duct and each having unobstructed vertical and short horizontal portions and an intermediate interconnecting closed impeller housing having a circular outer wall, said vertical and horizontal portions of each duct being connected to said closed impeller housing tangentially, with one wall of said vertical portion and one wall of said horizontal portion of each duct having tangential relation to a 90° arc of the outer circular wall of said housing, a high speed impeller having a plurality of closely spaced vanes rotatably mounted in each of said housings, the tips of adjacent vanes being spaced less than the length of the vanes, common shaft means for rotating said impellers continuously at high speed, each in a direction to tangentially accelerate material descending in the respective vertical portions and eject material at an accelerated velocity in the respective horizontal portions, a funnel-like chute mounted on a transverse rock shaft having its upper end loosely embracing said inlet duct and its lower end adapted to discharge alternately into one or the other of said branch ducts for directing material alternately into the vertical portion of either one or the other branch duct while maintaining continuous flow, said ducts affording free unobstructed flow at all times, whereby material is caused to flow in said horizontal portions at high velocity and uncompacted.

References Cited in the file of this patent

UNITED STATES PATENTS

| Number | Name | Date |
|---|---|---|
| Re. 17,316 | Nelson | June 4, 1929 |
| 375,267 | Cutler | Dec. 20, 1887 |
| 440,794 | Phillips | Nov. 18, 1890 |
| 772,446 | Weyant | Oct. 18, 1904 |
| 977,378 | Dunkerly | Nov. 29, 1910 |
| 1,070,388 | Bates | Aug. 19, 1913 |
| 1,175,573 | Weyant | Mar. 14, 1916 |
| 1,795,265 | Rice | Mar. 3, 1931 |
| 1,861,443 | Holzapfel | June 7, 1932 |
| 1,881,859 | Mullendore | Oct. 11, 1932 |
| 1,988,676 | Andreas | Jan. 22, 1935 |
| 2,062,438 | Baker | Dec. 1, 1936 |
| 2,075,274 | Darling | Mar. 30, 1937 |
| 2,098,246 | Jarrier | Nov. 9, 1937 |
| 2,101,561 | Rapp | Dec. 7, 1937 |
| 2,181,756 | Cook | Nov. 28, 1938 |
| 2,266,906 | Rapp | Dec. 23, 1941 |
| 2,318,881 | Mundy | May 11, 1943 |
| 2,345,287 | Peterson | Mar. 28, 1944 |
| 2,437,172 | Peterson | Mar. 2, 1948 |
| 2,466,386 | Curioni | Apr. 5, 1949 |
| 2,650,058 | Read | Aug. 25, 1953 |

FOREIGN PATENTS

| Number | Country | Date |
|---|---|---|
| 628,874 | Germany | Apr. 18, 1936 |
| 526,229 | Great Britain | 1940 |